United States Patent
Silverstein et al.

(10) Patent No.: US 7,813,589 B2
(45) Date of Patent: Oct. 12, 2010

(54) SYSTEM AND METHOD FOR BLENDING IMAGES INTO A SINGLE IMAGE

(75) Inventors: D. Amnon Silverstein, Mountain View, CA (US); Yining Deng, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 970 days.

(21) Appl. No.: 10/814,302

(22) Filed: Apr. 1, 2004

(65) Prior Publication Data
US 2005/0226531 A1    Oct. 13, 2005

(51) Int. Cl.
G06K 9/36    (2006.01)
G09G 5/00    (2006.01)

(52) U.S. Cl. ...................... 382/284; 345/629

(58) Field of Classification Search ............... 382/284, 382/276, 190, 195; 345/419, 427, 619–641
See application file for complete search history.

(56) References Cited

U.S. PATENT DOCUMENTS

| | | | | |
|---|---|---|---|---|
| 5,659,489 A * | 8/1997 | Baldur | ......................... | 382/108 |
| 5,991,461 A * | 11/1999 | Schmucker et al. | ......... | 382/284 |
| 6,075,905 A * | 6/2000 | Herman et al. | .............. | 382/284 |
| 6,078,701 A * | 6/2000 | Hsu et al. | .................... | 382/294 |
| 6,097,854 A * | 8/2000 | Szeliski et al. | .............. | 382/284 |
| 6,148,118 A * | 11/2000 | Murakami et al. | ........... | 382/284 |
| 6,271,847 B1 * | 8/2001 | Shum et al. | ................. | 345/418 |
| 6,351,269 B1 * | 2/2002 | Georgiev | .................... | 345/629 |
| 6,359,617 B1 * | 3/2002 | Xiong | ........................ | 715/848 |
| 6,362,832 B1 * | 3/2002 | Stephan et al. | .............. | 345/629 |
| 6,366,699 B1 * | 4/2002 | Kuwano et al. | ............. | 382/199 |
| 6,373,995 B1 * | 4/2002 | Moore | ......................... | 382/284 |
| 6,381,376 B1 * | 4/2002 | Toyoda | ........................ | 382/284 |
| 6,392,658 B1 * | 5/2002 | Oura | ........................... | 345/629 |
| 6,411,742 B1 * | 6/2002 | Peterson | ..................... | 382/284 |
| 6,434,265 B1 * | 8/2002 | Xiong et al. | ................. | 382/154 |
| 6,434,280 B1 * | 8/2002 | Peleg et al. | .................. | 382/299 |
| 6,487,323 B1 | 11/2002 | Bonnet et al. | | |
| 6,496,606 B1 | 12/2002 | Boutroux et al. | | |
| 6,532,036 B1 * | 3/2003 | Peleg et al. | .................... | 348/36 |

(Continued)

OTHER PUBLICATIONS

Adelson et al. "Pyramid methods in image processing", Nov./Dec. 1984, RCA Corporation, Edition 29-6, pp. 33-41.*

(Continued)

*Primary Examiner*—Bhavesh M Mehta
*Assistant Examiner*—Mia M Thomas

(57) ABSTRACT

A method and system for blending images into a single image. Initially two images of a view are selected, wherein the images have overlapping content of the view. The images can differ from each other in such characteristics as time, camera location, camera settings, and lighting. The images are divided into strips along a common plane in a region of each image where the images overlap. A strip from each image is selected where the images are a close match. Pixel by pixel difference values between the two strips are calculated, and a cut line is determined where the differences between the two strips are minimized. Each image is cut along the corresponding cut line, and the cut images are blended together to form a single image of the view. The blended single image can be further processed by warping the image along the cut line to provide for a smoother fit between the two images.

40 Claims, 10 Drawing Sheets

U.S. PATENT DOCUMENTS

| | | | |
|---|---|---|---|
| 6,549,651 B2 * | 4/2003 | Xiong et al. | 382/154 |
| 6,563,529 B1 * | 5/2003 | Jongerius | 348/36 |
| 6,568,816 B2 | 5/2003 | Mayer, III et al. | |
| 6,570,623 B1 | 5/2003 | Li et al. | |
| 6,590,574 B1 * | 7/2003 | Andrews | 345/419 |
| 6,592,225 B2 | 7/2003 | Wagner et al. | |
| 6,628,283 B1 * | 9/2003 | Gardner | 345/427 |
| 6,714,689 B1 * | 3/2004 | Yano et al. | 382/284 |
| 6,717,608 B1 * | 4/2004 | Mancuso et al. | 348/36 |
| 6,720,997 B1 * | 4/2004 | Horie et al. | 348/218.1 |
| 6,762,769 B2 * | 7/2004 | Guo et al. | 345/582 |
| 6,771,304 B1 * | 8/2004 | Mancuso et al. | 348/39 |
| 6,813,391 B1 * | 11/2004 | Uyttendaele et al. | 382/284 |
| 6,941,029 B1 * | 9/2005 | Hatori | 382/284 |
| 7,006,707 B2 * | 2/2006 | Peterson | 382/285 |
| 7,006,709 B2 * | 2/2006 | Kang et al. | 382/294 |
| 7,035,478 B2 * | 4/2006 | Crandall et al. | 382/284 |
| 7,085,435 B2 * | 8/2006 | Takiguchi et al. | 382/294 |
| 7,096,428 B2 * | 8/2006 | Foote et al. | 715/721 |
| 7,098,914 B1 * | 8/2006 | Katayama et al. | 345/427 |
| 7,130,490 B2 * | 10/2006 | Elder et al. | 382/294 |
| 7,142,725 B2 * | 11/2006 | Komiya et al. | 382/284 |
| 7,197,192 B2 * | 3/2007 | Edwards | 382/284 |
| 7,373,017 B2 * | 5/2008 | Edwards et al. | 382/284 |
| 7,375,745 B2 * | 5/2008 | Rai et al. | 348/218.1 |
| 7,424,218 B2 * | 9/2008 | Baudisch et al. | 396/322 |
| 7,529,429 B2 * | 5/2009 | Rother et al. | 382/284 |
| 7,535,497 B2 * | 5/2009 | Ouchi | 348/239 |
| 7,593,854 B2 * | 9/2009 | Belrose | 704/270.1 |
| 7,620,909 B2 * | 11/2009 | Park et al. | 715/790 |
| 7,653,261 B2 * | 1/2010 | Blake et al. | 382/284 |
| 2003/0076406 A1 * | 4/2003 | Peleg et al. | 348/36 |
| 2003/0235344 A1 * | 12/2003 | Kang et al. | 382/284 |
| 2004/0057633 A1 * | 3/2004 | Mai et al. | 382/284 |
| 2005/0226531 A1 * | 10/2005 | Silverstein et al. | 382/284 |
| 2006/0072851 A1 * | 4/2006 | Kang et al. | 382/294 |
| 2006/0072852 A1 * | 4/2006 | Kang et al. | 382/294 |

OTHER PUBLICATIONS

Burt et al. "The Laplacian Pyramid as a Compact Image Code", Apr. 1983, IEEE Transactions on Communications, vol. Com-31, No. 4, pp. 532-540.*

Mann & Picard "Virtual Bellows: Constructing High Quality Stils from Video", Nov. 1994, IEEE International Conference om Image Processing, pp. 363-367.*

Pham et al. "Color Correction for an Image Sequence", 1995, IEEE, pp. 38-42.*

E. H. Anderson et al, "Pyramid Methods In Image Processing", RCA Engineers, Nov./Dec. 1984. pp. 33-41.

Peter J. Burt, "The Laplacian Pyramid As A Compact Image Code", IEEE, vol. Com-31, No. 4, Apr. 1983, pp. 532-540.

* cited by examiner

SYSTEM AND METHOD FOR BLENDING IMAGES INTO A SINGLE IMAGE

BACKGROUND

Photographers, graphic artists, and others desiring to capture an image of a scene, person, device, or event can use a device such as a still camera, a video camera, a web-cam, or the like to record the desired image. At times, the field of view of the captured image is too small, either too narrow (horizontal deficiency), too short (vertical deficiency), or both, for the photographer or user. The photographer can take two or more images while panning across the desired scene and can combine the multiple images into a composite image, or panorama, of the entire scene.

The resultant images can be cut and pasted together, whether manually, electronically, or digitally to combine the separate images or pictures into a single image. However, slight variations in the separate images can cause the cut and paste single image to appear as a mosaic instead of a contiguous, single image of the scene. The variations in the separate images can be the result of differences in projection angle and/or motion within the scene between the times the images were captured.

Various techniques have been proposed for blending images together to form a single image. One such method for blending overlapping images together utilizes Laplacian and Gaussian pyramids. An algorithm-based technique for blending overlapping images together can also be used.

Additional techniques have been disclosed that utilize both blending and warping to process images. For example, a blended image can be distorted with warping. Alternately, an image can first be morphed and then the colors of the warped image can be blended.

SUMMARY

Exemplary embodiments are directed to a method and system for blending images into a single image, including selecting two images having overlapping content; dividing the two images into strips; selecting a strip in each of the two images where the two images overlap each other; determining differences between the overlapping two strips; determining a line through the overlapping strips where the differences between the overlapping strips are minimized; and blending the two images together along the minimized line to create a single image.

An additional embodiment is directed toward a method for blending two images into a single image, including dividing two images into strips along a common plane; selecting a strip in each image where the two images overlap; determining a line through the overlapping strips where differences between the overlapping strips are minimized; blending the two images along the determined minimized line to create a single image; and warping the single image to minimize blurring along the blending line.

Alternative embodiments provide for a computer-based system for blending images into a single image, including a computer configured to divide two images having overlapping content into strips; select a strip in each of the two images where the two images overlap each other; determine pixel difference values between the overlapping two strips; determine a line through the overlapping strips where the sum of the pixel difference values between the overlapping strips are minimized; and blend the two images together along the minimized line to create a single image.

A further embodiment is directed to a system for blending images into a single image, including means for dividing two images having overlapping content into strips in at least one region of overlap; means for calculating difference values between the pixels of the two images in the at least one region of overlap; means for determining a cut line through the two images where the difference values are minimized; and means for blending the two images along the cut line to create a single image.

Yet a further embodiment is directed to a system for blending images into a single image, including a first computing module dividing two images having overlapping content into strips in at least one region of overlap; a second computing module calculating difference values between the pixels of the two images in the at least one region of overlap; a third computing module determining a cut line through the two images where the difference values are minimized; and a fourth computing module blending the two images along the cut line to create a blended single image.

Another embodiment provides for a computer readable medium encoded with software for blending images into a single image, wherein the software is provided for selecting two images having overlapping content; dividing the two images into strips where the two images overlap each other; selecting a strip in each of the two images; determining the differences between the overlapping two strips; determining a line through the overlapping strips where the differences between the overlapping strips are minimized; and blending the two images together along the minimized line to create a single image.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements, and.

DETAILED DESCRIPTION OF THE EMBODIMENTS

Figure 1:
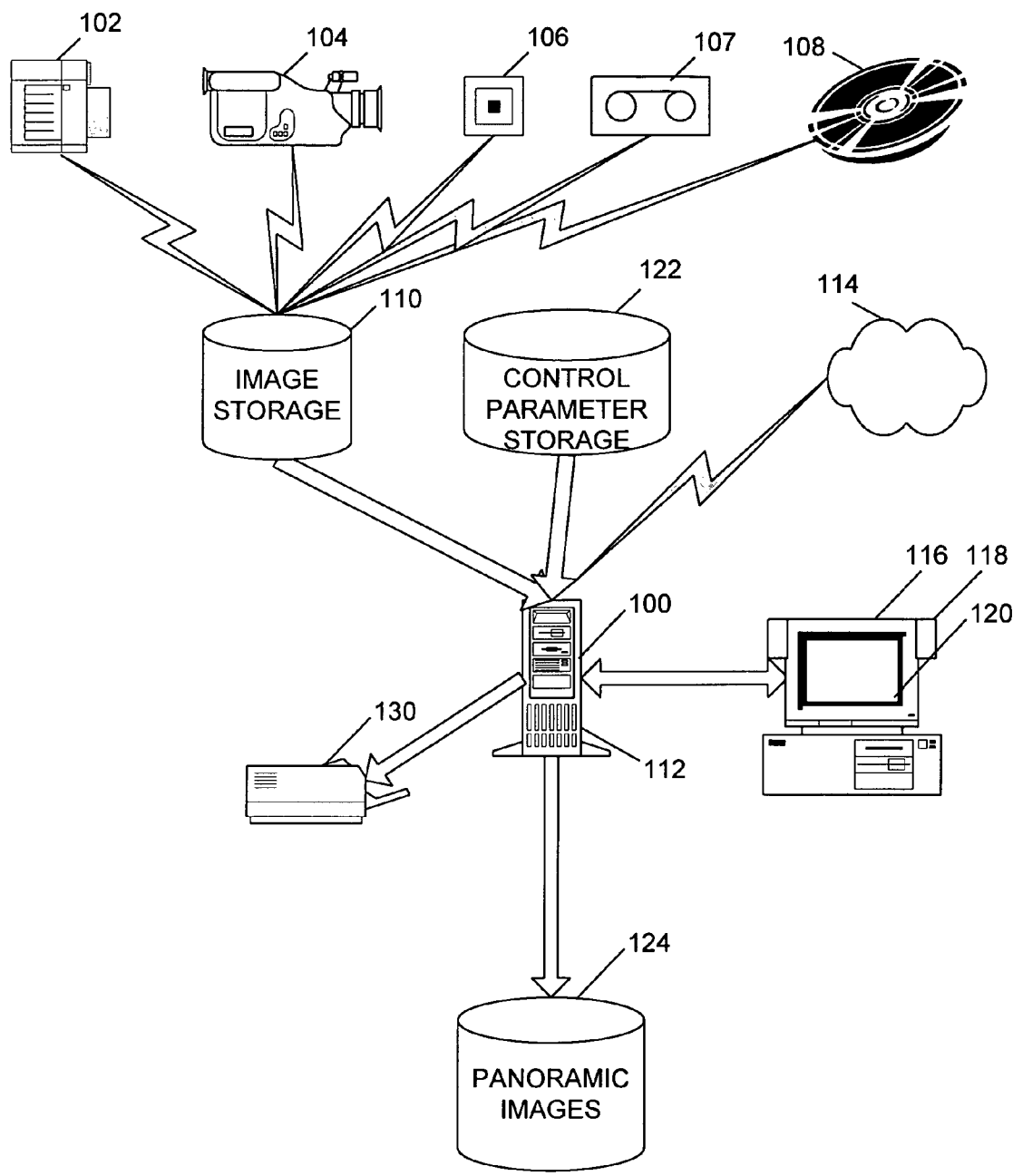
FIG. 1 shows a component diagram of a system for blending images into a single image in accordance with an exemplary embodiment of the invention.

Referring initially to FIG. 1, there is illustrated a computer-based system for blending images into a single image according to an exemplary embodiment. Exemplary embodiments can be implemented on a computer having a processor, including a personal computer, a network server, a mainframe computer, and the like. Those of ordinary skill in the art will appreciate that the use of the term, "blending," is intended to broadly represent the combining of multiple images into a single image without limitation. The terms of "tiling" and "stitching" are also in use in the art to represent the combining of multiple pictures into a single image, and the term "blending" is intended to encompass such terms. Further, the term, "single image," is intended to broadly encompass an image resulting from combining of two or more images together. Terms included in single image include mosaic, composite, and panoramic images.

The system of FIG. 1 shows a recording device such as a camera 102, including a digital camera, configured to record an image of a scene, event, person, device, or any such desired view. Alternatively, any number of image recording devices, such as a video camera 104 or a web-cam 106, can be used to capture an image. The resultant recorded image can be stored on such media as cassette tapes 107 and/or CD's 108. For the convenience of processing the images, the recorded images can also be stored in a memory or on a storage device 110 to be subsequently processed by a computer 100 comprising one or more processors 112.

Exemplary embodiments are compatible with various networks 114, including the Internet, whereby the images can be downloaded across the network for processing on the computer 100. The resultant single images can be uploaded across the network 114 for subsequent storage and/or browsing by a user who is situated remotely from the computer 100.

One or more images are input to a processor 112 in a computer 100 according to exemplary embodiments. Means for receiving the images for processing by the computer 100 can include any of the recording and storage devices discussed above and any input device coupled to the computer 100 for the reception of images. The computer 100 and the devices coupled to the computer 100 as shown in FIG. 1 are means that can be configured to receive and blend the images into a single image or view according to exemplary embodiments. In particular, the processor 112 in the computer 100 can be a single processor or can be multiple processors, such as first, second, and third processors, each processor adapted by software or instructions of exemplary embodiments for performing blending of images into a single image according to exemplary embodiments. The multiple processors 112 can be integrated within the computer 100 or can be configured in separate computers which are not shown in FIG. 1. The processor(s) 112 can comprise one or more computing modules, such as first, second, or third computing modules, to perform the steps shown in FIG. 2.

These processor(s) and the computing modules and/or software guiding them can comprise the means by which the computer 100 can select a strip in each of two images where the images overlap each other and can determine a cut line through the two strips where the images can be joined to form a single image. For example, separate means in the form of software modules within the computer 100 can control the processor(s) 112 for selecting the best strip in each image where the images overlap and for blending the images along a cut line in the strips for creating a single image of a scene. The computer 100 can include a computer-readable medium encoded with software or instructions for controlling and directing processing on the computer 100 for directing blending of images into a single image.

The computer 100 can include a display, graphical user interface, personal computer 116 or the like for controlling the processing of the classification, for viewing the classification results on a monitor 120, and/or for listening to all or a portion of sound signals associated with the images over the speakers 118. One or more images are input to the computer 100 from a source of images as captured by one or more still cameras 102, video cameras 104, or the like and/or from a prior recording of a scene or event stored on a medium such as a tape 107 or CD 108. While FIG. 1 shows the images from the still camera 102, the video camera 104, the tape 107, and the CD 108 being stored on an image storage medium 110 prior to being input to the computer 100 for processing, the images can also be input to the computer 100 directly from any of these devices without detracting from the features of exemplary embodiments. The media upon which the images is recorded can be any known analog or digital media and can include transmission of the images from the site of the event to the site of the image storage 110 and/or the computer 100.

Embodiments can also be implemented within the capture/recording devices 102, 104, and 106 themselves so that the images can be blended concurrently with, or shortly after, the images being recorded. Further, exemplary embodiments of the image blending system can be implemented in electronic devices other than the computer 100 without detracting from the features of the system. For example, and not limitation, embodiments can be implemented in one or more components of an image projection system, such as in a CD/VCD/DVD player, a VCR recorder/player, etc. In such configurations, embodiments of the image blending system can blend images prior to or concurrent with the display of the single image(s).

The computer 100 optionally accepts as parameters one or more variables for controlling the processing of exemplary embodiments. As will be explained in more detail below, exemplary embodiments can apply one or more control parameters to guide the image blending processing to customize the blending and warping of the images to create single images according to the preferences of a particular user. Parameters for controlling the blending and warping processes can be retained on and accessed from storage 122. For example, a user can select, by means of the computer or graphical user interface 116, parameters for establishing how smoothly, or seamlessly, exemplary embodiments should blend two images together to produce a single image of a scene. These control parameters can be input through a user interface, such as the computer 116 or can be input from a storage device 112, memory of the computer 100, or from alternative storage media without detracting from the features of exemplary embodiments. Single images blended by exemplary embodiments can be written into a storage media 124 in the forms of files, catalogs, libraries, and/or databases in a sequential and/or hierarchical format. The processor 112 operating under control of exemplary embodiments can output the results of the image blending process, including printed images, summaries, and statistics, to a printer 130.

Figure 2:
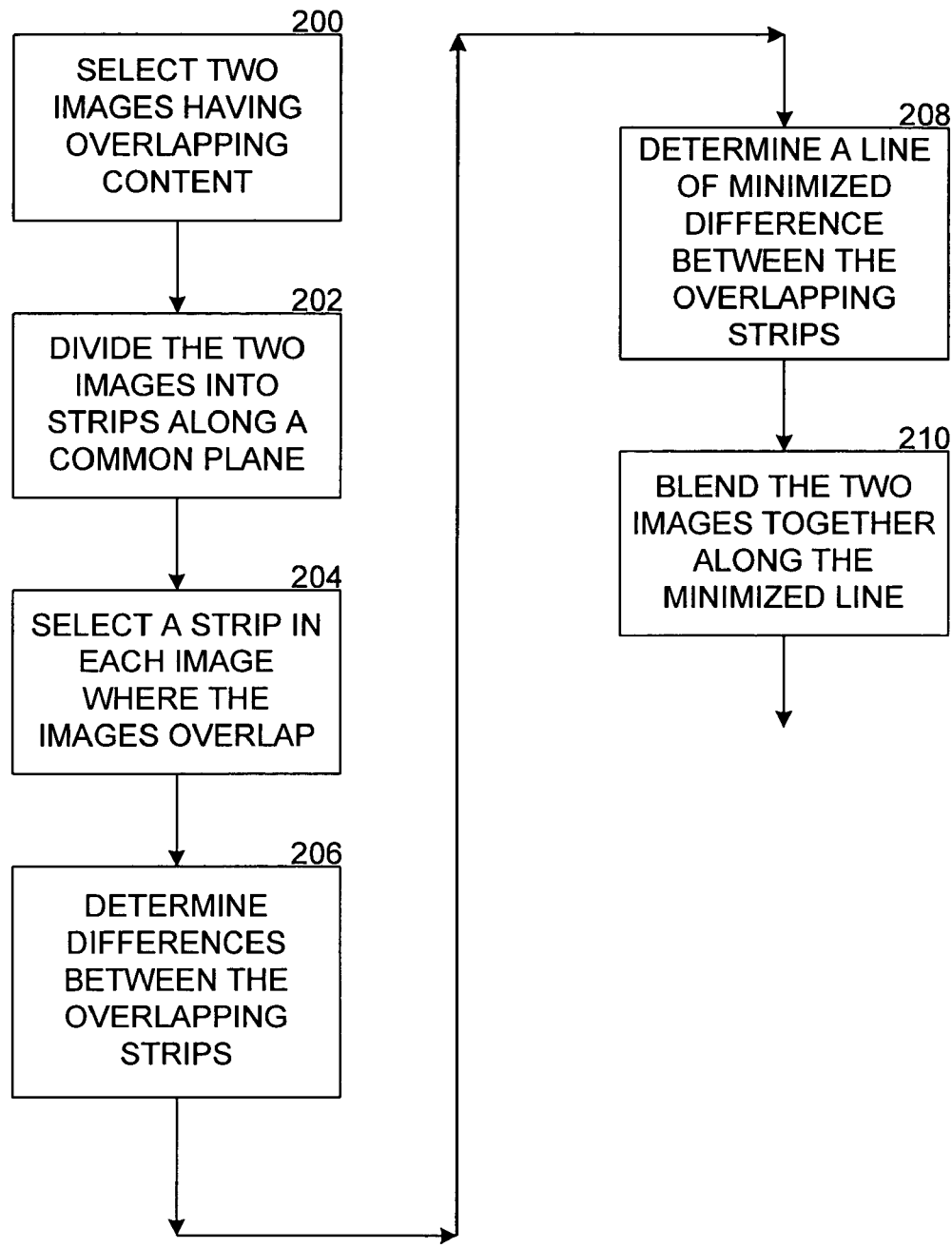
FIG. 2 shows a block flow chart of an exemplary method for blending images into a single image.
Figure 4:
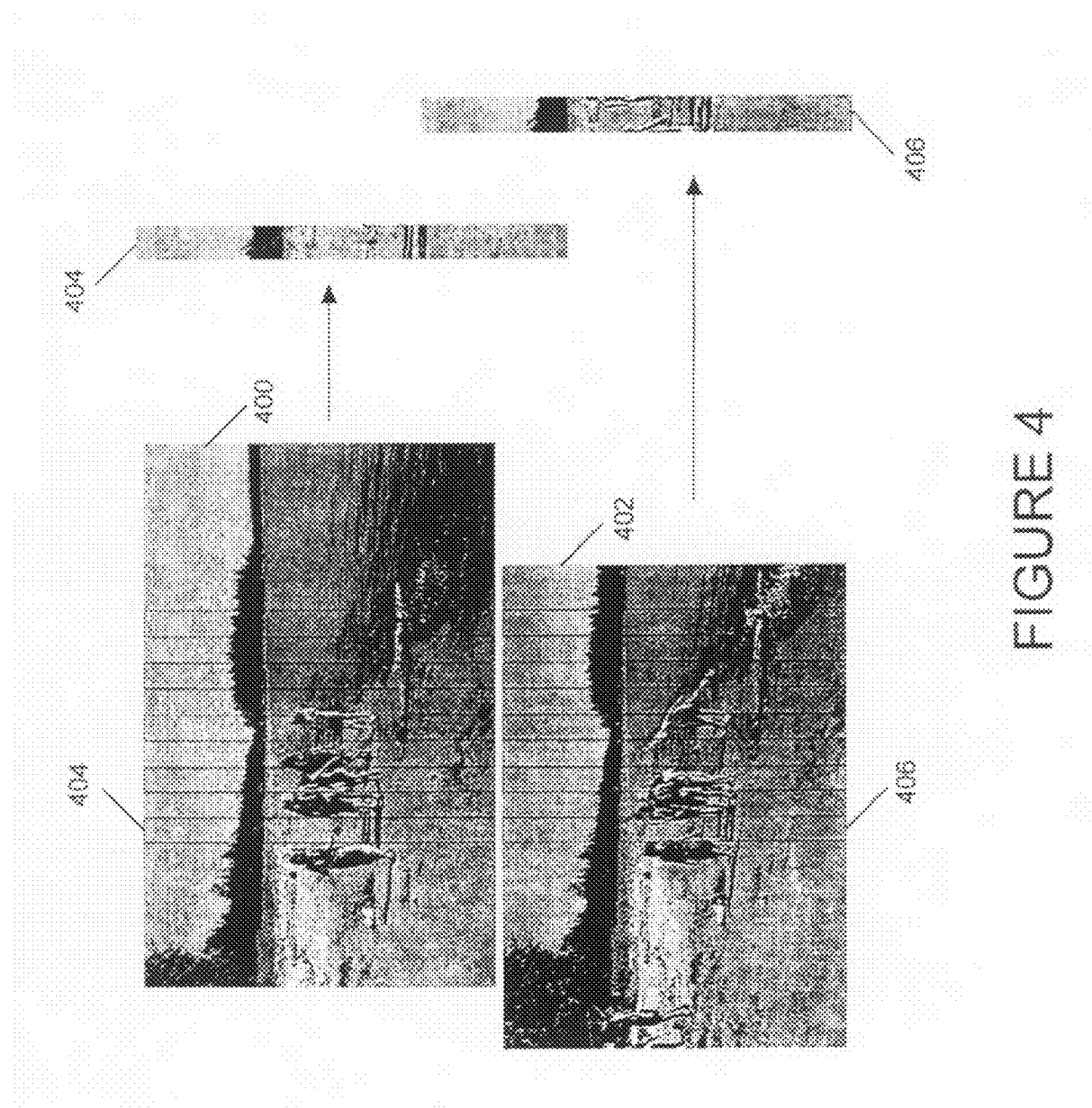
FIG. 4 shows two images of the same beach scene, with the images differing in time and field of view.

The functionality of an embodiment for automatically blending images to create a single image can be shown with the following exemplary flow description:

Blending Images into a Single Image:
    Select two images for blending
    Dividing the two images into strips along a common plane Select a strip in each of the two images where the images overlap Determine a line through the two strips where the differences between the two images is minimized Blend the two images along the determined minimized line Repeat the process until all images are blended into a single image Referring now to FIGS. 1, 2, and 4, a description of an exemplary embodiment of a system for blending images into a single image will be presented. An overview of the image blending process is shown in FIG. 2, and a pair of exemplary images to be blended is shown in FIG. 4. At step 200 two images, 400 and 402, of an exemplary beach scene are selected from image storage 110 for blending into a single view of the scene. The two images show at least part of a common scene, with at least partial scene overlap between the two images. The images of the scene can differ from each other in such areas as the scope or field of image coverage, the time the images were recorded, the location from which the images were captured, the devices capturing the images, the settings of the camera(s) recording the scene, the lighting of the scene, the shadows in the scene, and/or the background of the scene. FIG. 4 shows two beach scene images, 400 and 402, that were taken at slightly different times and with different width of field settings on the camera, with image 402 having been taken at a slightly later time and at a center of image somewhat to the left from the timing and orientation of image 400. At step 202, each image is divided into strips along a common plane. The vertical lines in each image represent exemplary strips that can be drawn or established to divide the images. The strips can be limited to all or a portion of where the images overlap. In the exemplary case of the images of FIG. 4, strips have been drawn in the general center portion of the images 400 and 402. The number and/or width of the strips can be selected by the user with a parameter or can be established by the image blending system. Additionally, the system can compare the differences between the two images such as pixel by pixel or by intensity and can establish an area of overlap for creating strips where the differences between the images are less than a predetermined or selected threshold. At least one strip is created in each image; and the strips are created such that for each strip in one image, there is a corresponding strip in the other image showing approximately the same scene portion. While FIG. 4 shows strips aligned along a vertical plane, any common plane can be utilized to divide the two images, depending on the orientation of the images.

One strip from each of the two images is selected in step 204 where the images overlap. In FIG. 4, strip 404 has been selected from image 400, and strip 406 has been selected from image 402. The criteria for the selection of a strip in each of the images is to find an area in each of the images where the two respective image scenes overlap each other and where the best match, or the minimal error, between the two image scenes is found. One technique by which exemplary embodiments can select overlapping and matching strips from each image is by calculating the mean squared error or difference between paired strips of the two images according to the following mean squared difference algorithm:

$$(R_1-R_2)^2+(G_1-G_2)^2+(B_1-B_2)^2=\text{Diff Value}$$

A relative difference value for determining the image differences between $\text{strip}_1$ (404) of $\text{image}_1$ (400) and $\text{strip}_2$ (406) of $\text{image}_2$ (402) is calculated by first finding the sum of the squared differences of each of the red, green, and blue (RGB) color pixel values for each pair of corresponding pixels between the two strips and then adding together all such difference values for that pair of strips. The difference value can also be viewed as a mean squared error value of the degree of mismatch between the two images at their respective strips. Each strip is selected to have the same number of pixels so the mean squared color difference algorithm can be applied throughout each strip. Under this technique, the differences in the red, green, and blue pixel values for each pair of corresponding pixels in the two strips are squared and summed to produce the image pixel difference value representing the measure of difference between the two image strips, such as 404 and 406. By iteratively calculating the mean squared difference value between selected strips from the two images, exemplary embodiments can select a pair of strips, one from each image 400 and 402, where the image difference between the two strips is minimized and, accordingly, the overlap between the two images is the closest match at the selected strips. As can be seen by comparing strips 404 and 406, the strip of the images shown by these strips is very similar, although not identical, and is representative of an area within the image scene where the two images, 400 and 402, overlap. While the mean squared pixel difference value has been disclosed for selecting overlapping image strips 404 and 406, exemplary embodiments are not so limited, and any known technique for matching and/or comparing images can be utilized to select a strip from each of two overlapping images where the difference or mismatch in the overlap is minimized. For example, a pixel by pixel intensity or luminescent comparison between two sample strips can be utilized to select two overlapping and matching strips. The width of the strips can be reduced by the user to reduce the computational time and resources to perform the steps of strip selection. Similarly, the number of strips and the size of the image region to be divided into strips can be limited to control processing time and resources.

Figure 5:
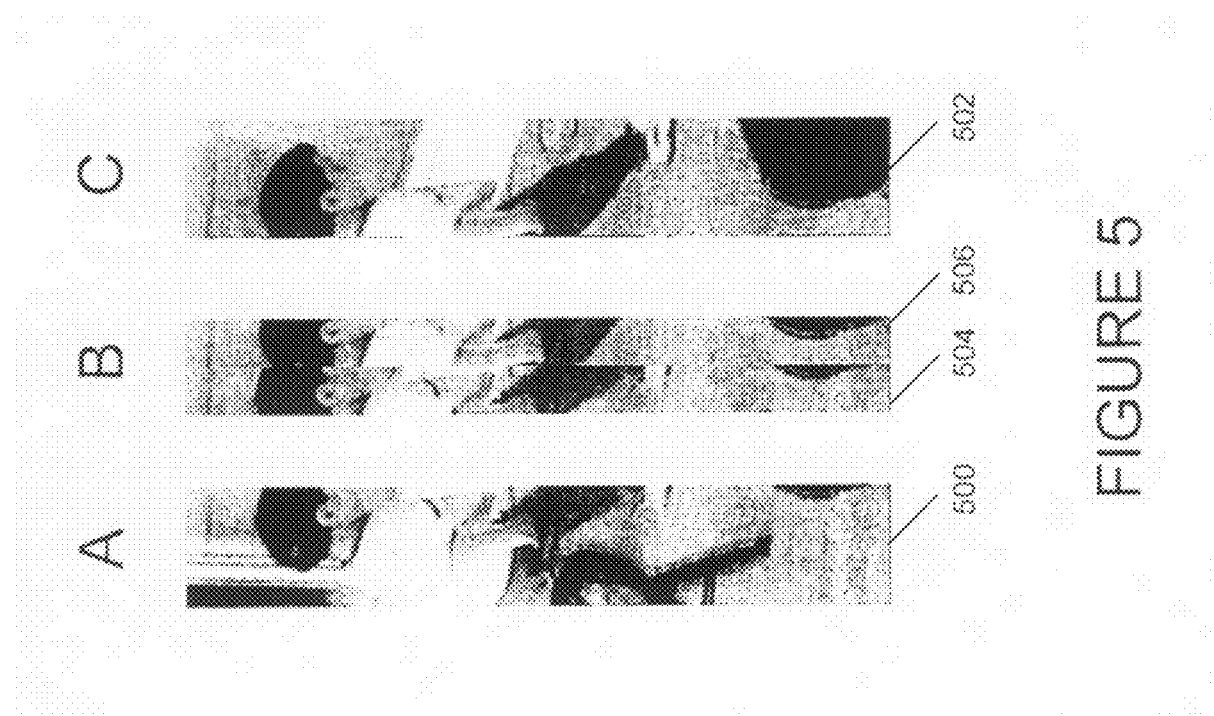
FIG. 5, consisting of FIGS. 5A, SB, and 5C, shows two images of the same action scene, with the images differing in time.

Referring now to FIG. 5, there is shown at FIGS. 5A and 5C two images, 500 and 502, of a boy in the process of walking forward. Image 502 was taken slightly later in time from image 500 and with a center of field slightly to the right of the center of image 500. FIG. 5B shows two strips, 504 and 506, positioned here side by side for the sake of comparison. Strip 504 has been selected from image 500 of FIG. 5A, and strip 506 has been selected from image 502 of FIG. 5C by exemplary embodiments as an overlap area of best match between images 500 and 502 for combining image 500 and image 502 into a single image of the boy walking.

Figure 6:
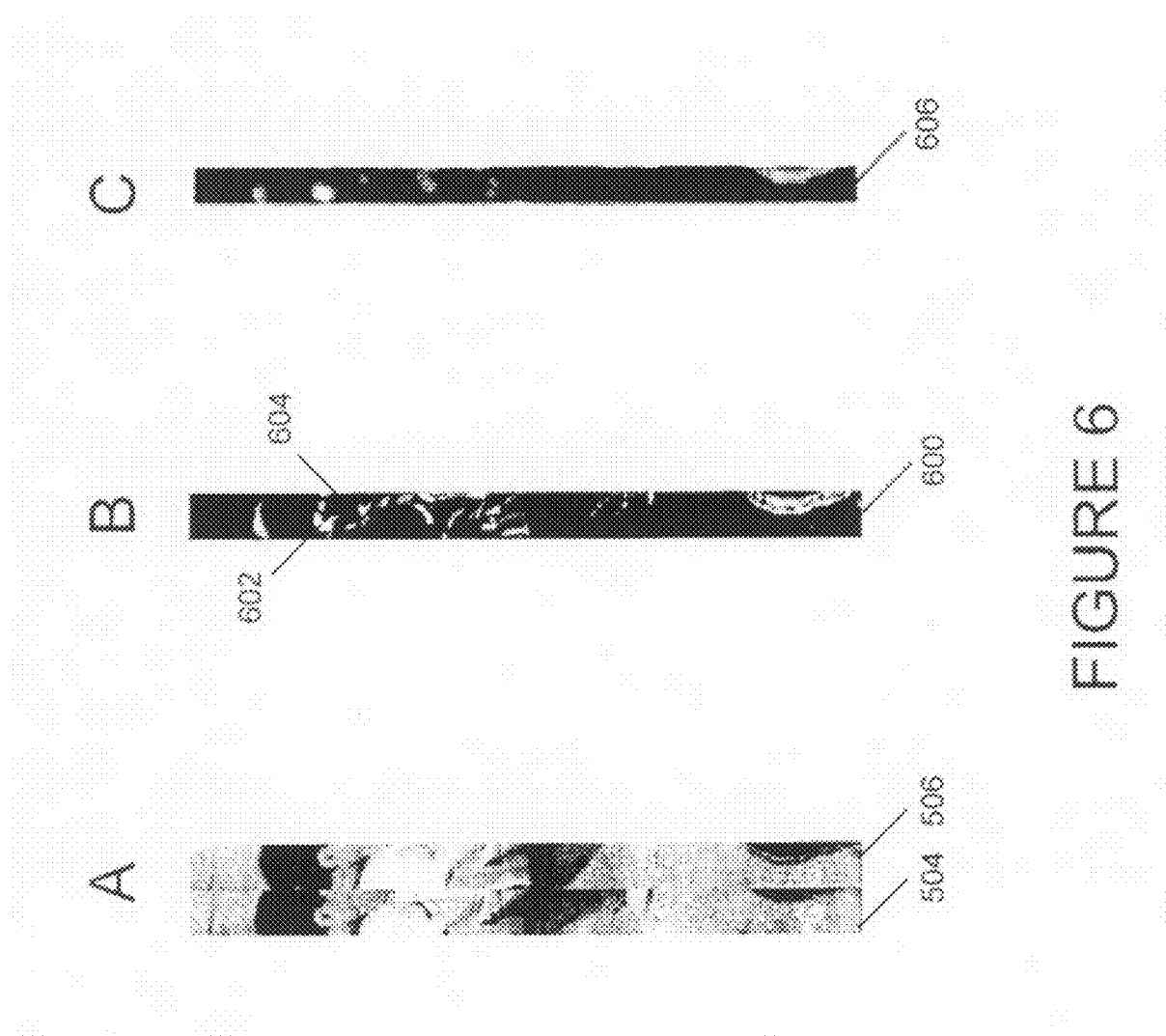
FIG. 6, consisting of FIGS. 6A, 6B, and 6C, shows a progression of gray scale image processing of a pair of overlapping strips of images.

Referring now to FIG. 6, the selected strips, 504 and 506, of FIG. 5B are now shown in FIG. 6A. The next step in the method for blending two images into a single image, step 206, is applying an image matching or comparison algorithm to the two strips 504 and 506 to determine the pixel differences between the overlapping two strips. In an exemplary embodiment, the pixel differences between the two strips can be determined, pixel by corresponding pixel, by a mean squared difference algorithm in a manner similar to the calculation of the pixel difference values for selecting the overlapping strips. Alternately, the difference between the overlapping strips can be calculated based on pixel intensity or luminescent values. Once the difference values between the pairs of corresponding pixels in the strips is determined, the pixel to pixel difference values between the two strips can be converted to shades of gray for each pair of pixels, one from each strip at a given pixel location, and represented graphically as a gray scale difference image 600 as shown in FIG. 6B. In the exemplary gray scale difference image of FIG. 6B, dark areas represent areas between the two strips 504 and 506 that match closely, and the light and bright tones represent areas of mismatch between the strips. For example, the cheek of the two strips 504 and 506 appears as a dark area 604 in the gray scale difference image 600 whereas the ear of the boy shows as a bright area 602 of mismatch between the two strips 504 and 506 and, correspondingly, between the two images 500 and 502. FIG. 6C shows a blurred image 606 of mismatch between the strips 500 and 502 where the degree of mismatch between the pixels of each image is represented as varying degrees of brightness, thereby blurring the overlapped image.

Figure 3:
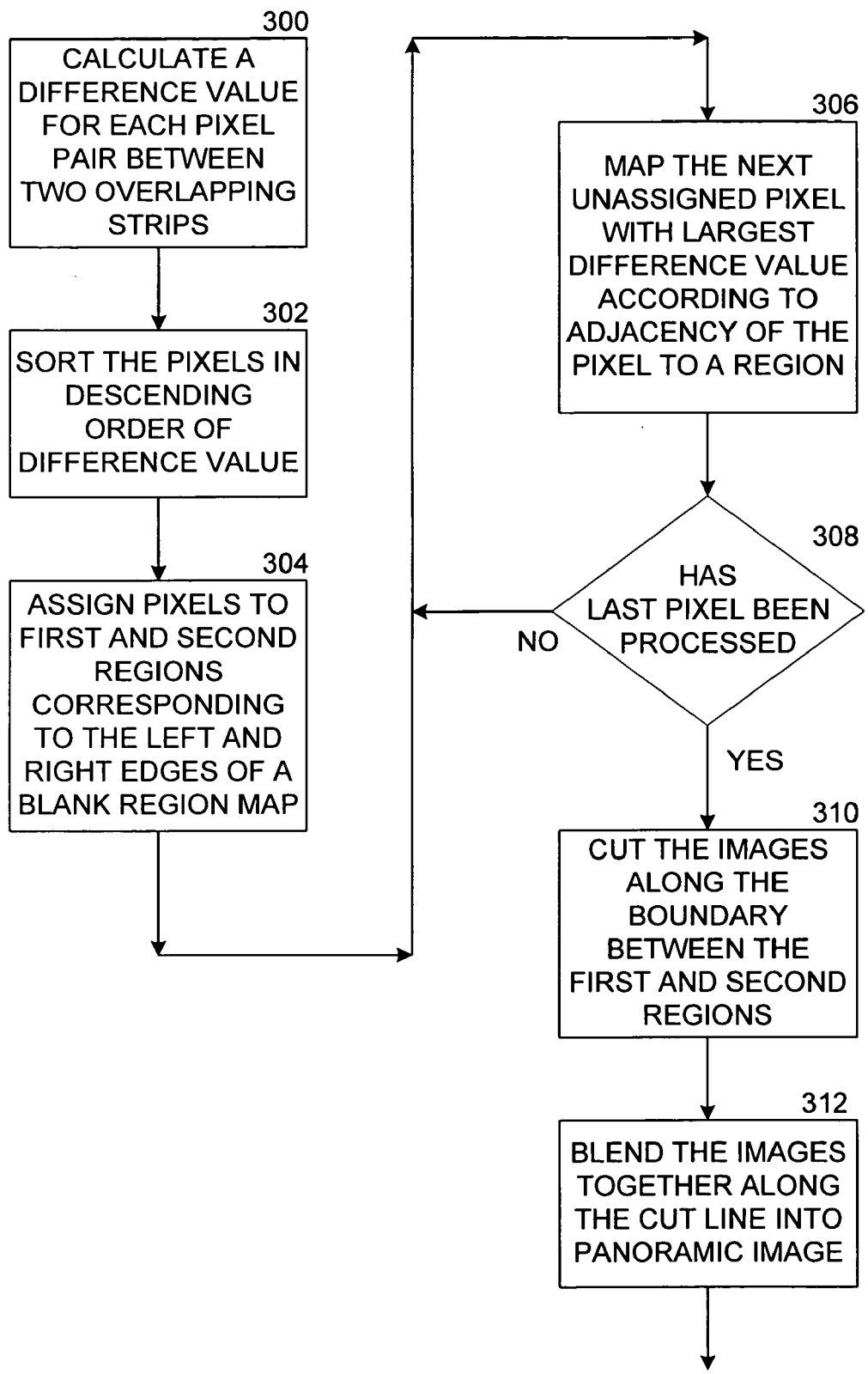
FIG. 3 shows a block flow chart of an exemplary method for determining a cut line for blending the images into a smooth single image.
Figure 7:
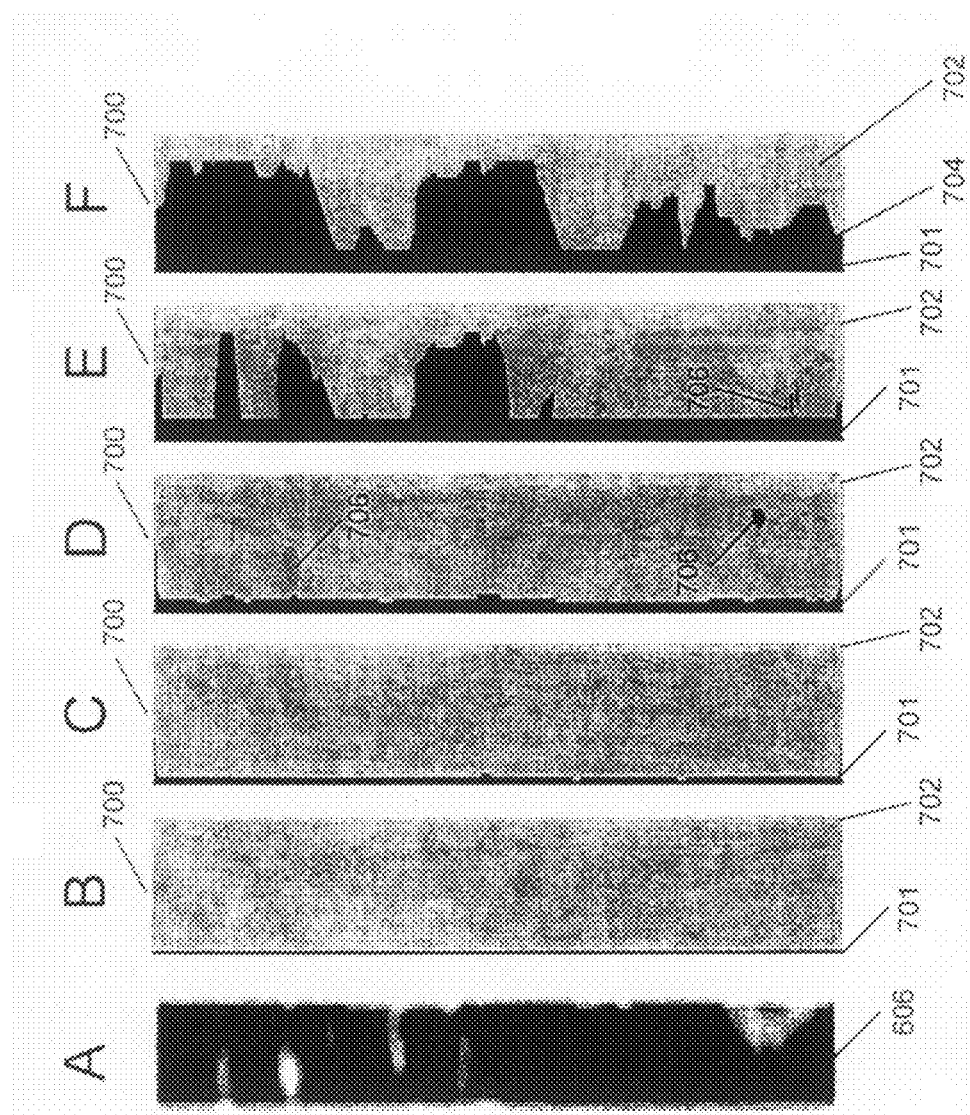
FIG. 7, consisting of FIGS. 7A, 7B, 7C, 7D, 7E, and 7F, shows iterative processing for determining a cut line between two overlapping image strips.

At step 208, represented by the figures of FIG. 7, a line is determined through the combined image of the strips where the differences between the strips is minimized. It will be along this line that the two strips, and thus the two images, will be cut to blend the images into a single image at step 210. FIG. 7A will be recognized as a slightly enlarged version of FIG. 6C, representing a gray scale image of the differences between the two image strips 504 and 506. Because the darker portions of image 606 represent areas of closer match between the strips 504 and 506, exemplary embodiments will determine a line through the darker areas of the image 606 as the areas of greatest match or alignment between the images where the two images can be blended together for a smooth fit. FIGS. 7B through 7F show the iterative process of growing the first and second regions, from left and right respectively, to achieve a cut line 704 between the images 500 and 502 for blending them into a single image. The method for determining the cut line is shown in the block flow diagram of FIG. 3.

The first step, step 300, for determining a line where the images should be cut for being combined into a single image is to calculate a difference value for each pixel pair between the two overlapping strips. In some embodiments, as discussed above, this step has already been completed during the process of determining the two overlapping strips to be selected for finding the best matching strip between the two images. For example, a mean squared difference algorithm can be used to determine a difference value between each pair of pixels in the corresponding overlapping strips 504 and 506. Next, at step 302, the pixels of the difference image shown in FIG. 7A are sorted in descending order of difference value, from the pixel of largest difference value between the strips to the pixel of smallest difference value, or closest match.

FIG. 7B shows a blank region map 700 that has the same number of pixels as the overlap region as represented by FIG. 7A. At step 304, all pixels that lie on the left edge of the difference image 606 are assigned or mapped to a first region 701, and all pixels that lie on the right edge of the difference image 606 are assigned to a second region 702. Starting with the sorted pixel of the greatest difference value and proceeding, pixel by pixel, to the pixel of the smallest difference value of the gray scale image 606 of FIG. 7A, all the remaining unassigned pixels of the difference image 606 are mapped by adjacency to either the first region 701 or the second region 702 of the region map 700 as follows.

At step 306, the next unassigned pixel with the greatest difference value is processed and mapped to the region 700 according to the adjacency of the pixel to a region. If the pixel is adjacent to region 701 and is not adjacent to any other region, the pixel is assigned, or mapped, to region 701. If the pixel is adjacent to region 702 and is not adjacent to any other region, the pixel is assigned to region 702. If the pixel is adjacent to both regions 701 and 702, the pixel is arbitrarily assigned to either region 701 or 702. For example, the dual adjacent pixels can alternately be assigned first to region 701 and next to region 702. If the pixel is adjacent to no other regions, a new region 706 is created within 700; and the pixel is assigned to the new region 706. If the pixel is not adjacent to either region 701 or region 702 but is adjacent to one of the aforementioned new regions 706, the pixel is assigned to the adjacent new region 706. Further, if the pixel is adjacent to two or more new regions 706, those regions are combined into a single new region 706.

If the pixel is adjacent to region 701 and is also adjacent to one or more new regions 706, then the pixel is assigned to region 701; and all the pixels in the other adjacent regions 706 are also assigned to region 701. Correspondingly, if the pixel is adjacent to region 702 and is also adjacent to one or more new regions 706, then the pixel is assigned to region 702; and all the pixels in the other adjacent regions 706 are also assigned to region 702. If the pixel is adjacent to both regions 701 and 702 and is also adjacent to one or more new other regions 706, then the pixel is arbitrarily assigned to either region 701 or 702, as discussed above. In this situation, all the pixels in the other adjacent regions 706 are assigned to the same region, 701 or 702, to which the pixel was assigned.

All remaining pixels in the difference image 606 of FIG. 7A are processed in a similar manner, as shown in the progression of the region map 700 from FIG. 7B to FIG. 7F, until all the pixels are assigned to the first and second regions 701 and 702. In FIG. 7C, for example, the first region 701 and the second region 702 are shown to have grown in size from the respective first and second regions as shown in FIG. 7B as more of the pixels of the difference image 606 are mapped to the region map 700. Correspondingly, as more pixels of the difference image 606 are mapped to the region map 700, the first and second regions 701 and 702 grow from the left and right, respectively, as shown in FIG. 7D. Areas 706 of FIG. 7D represent those mapped "new other regions" of pixels that are not yet adjacent to or part of any of the first region 701 or the second region 702.

The mapping of all of the pixels of the difference image 606 produces the image of FIG. 7F with a completed first region 701 and a completed second region 702. The boundary 704 between the left and right regions represents a single line of pixels that are adjacent to both the first and second regions and represents the cut line to be made through the image strips 504 and 506 where the differences in the overlapping strips are minimized. This cut line also becomes the line or the template by which the two corresponding images 500 and 502 of the boy walking are cut at step 310. The two now cut images 500 and 502 are blended together at step 312 along their common, minimized cut line to blend the images into a single image of the boy walking. By use of the term, "cut," exemplary embodiments can, for example and not limitation, digitally divide the two images 500 and 502 along the common cut line, saving the respective left and right sides of images 500 and 502, and combining the saved sides into a blended single image.

In another exemplary embodiment, a plurality of images exceeding two images can be blended into a single image. In this embodiment, two images at a time are selected for blending into a single image. The resultant single image is then reinput to the image blending process as one of two selected images, with a new, unprocessed image constituting the second selected image. This process continues until all images comprising the scene, event, or the like have been processed, resulting in a final single image blended from the plurality of images. In like manner, separate frames of a video sequence can be blended into a single image of the video.

Figure 8:
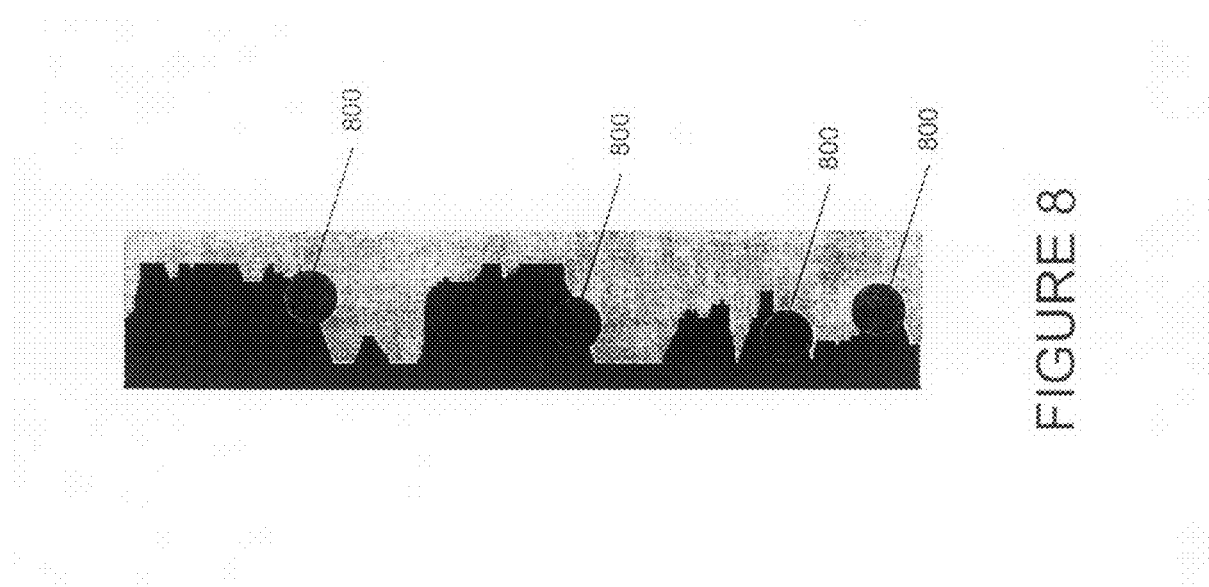
FIG. 8 shows areas of blurred matching along the cut line determined between two overlapping image strips.
Figure 9:
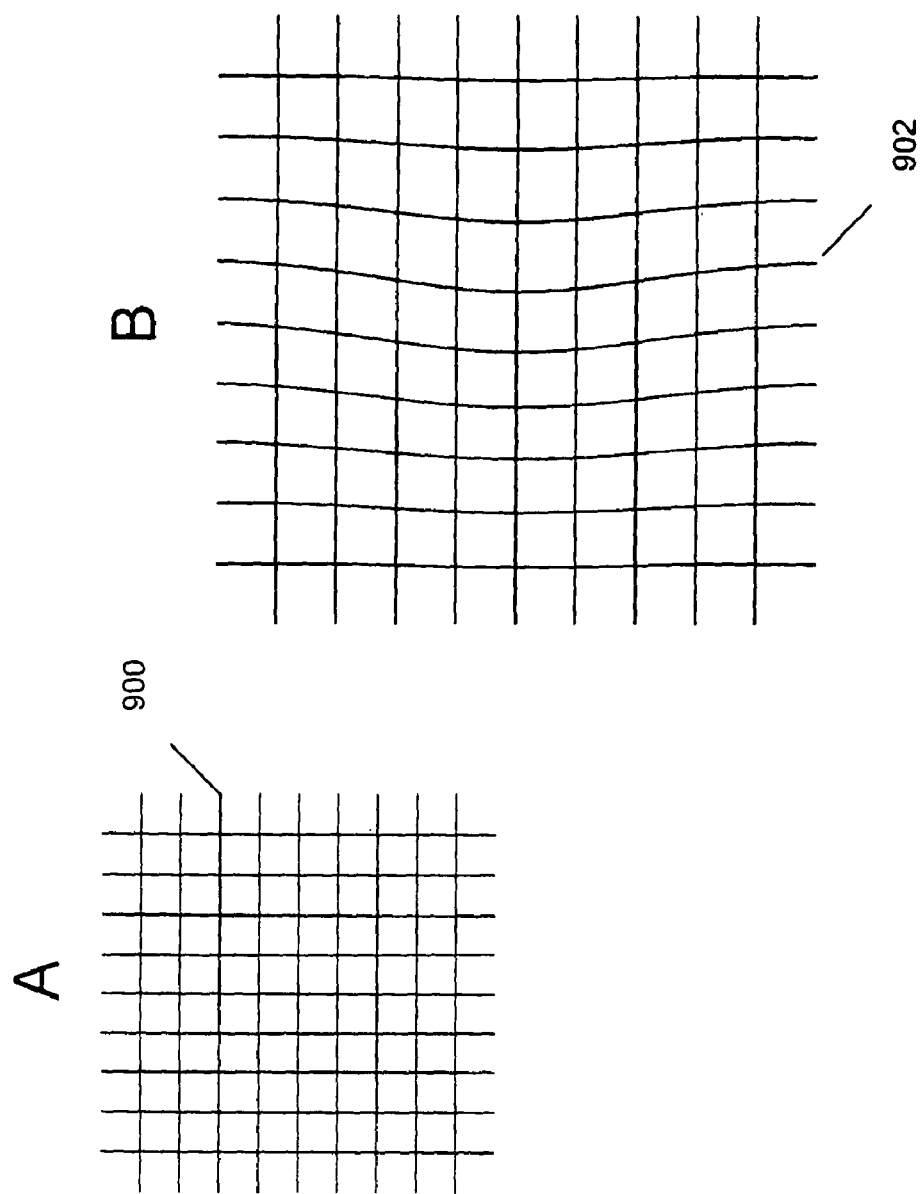
FIG. 9, consisting of FIGS. 9A and 9B, shows warping of an image by Gaussian warping.
Figure 10:
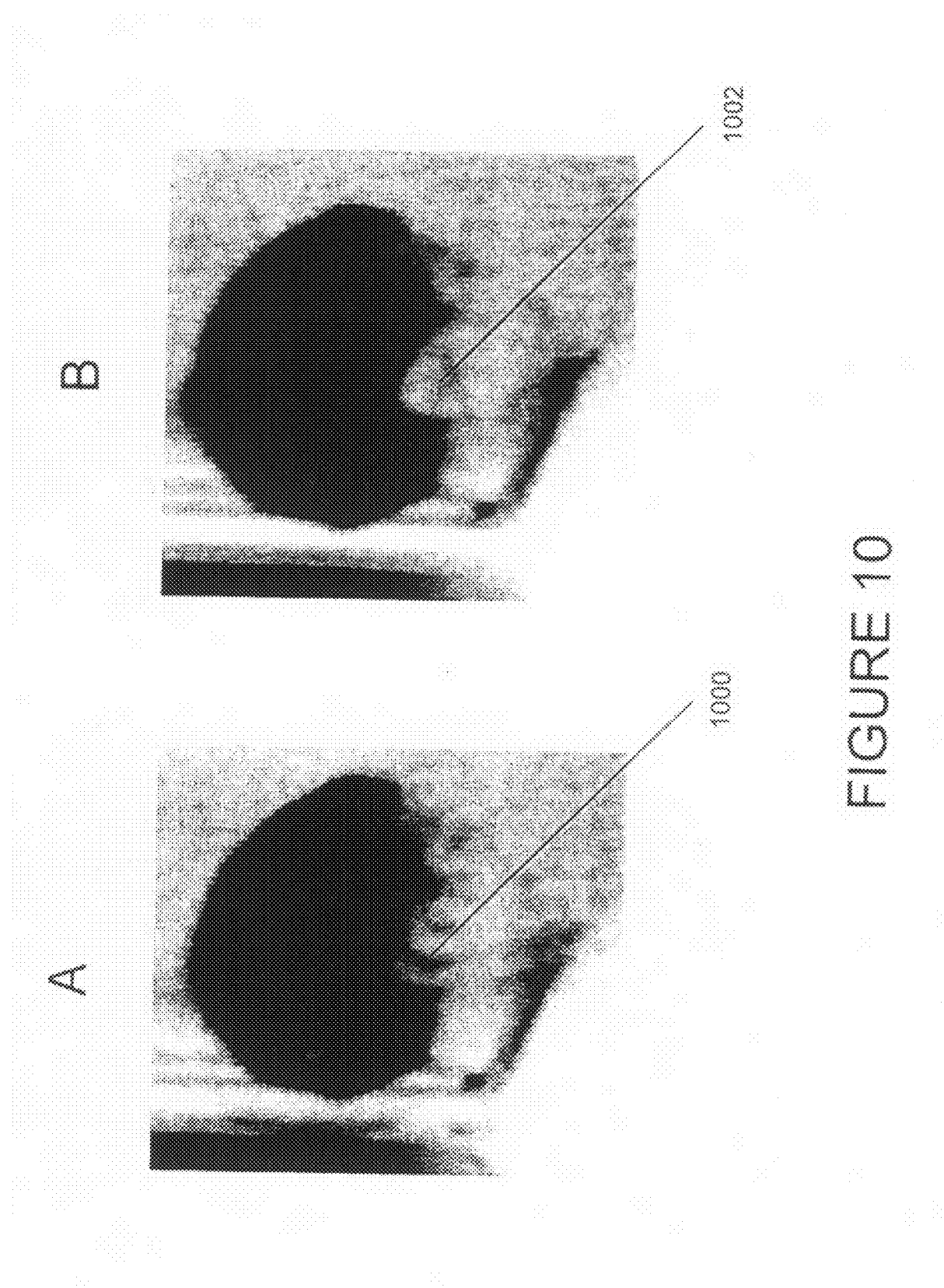
FIG. 10, consisting of FIGS. 10A and 10B, shows application of warping to smooth a blended image.

In an alternate embodiment, represented by FIGS. 8, 9, and 10, the line along which the images have been cut and blended can be further smoothed to produce a better seam between the images in the resultant single image. In this embodiment, a Gaussian pyramid and/or spatial warping can be applied to the pixels in the area of the cut to improve the fit between the images along the cut. For example, the difference values of the pixels along the cut line 704 can be compared against a predetermined threshold of image match, optionally selected by the user from control parameter storage 122, to determine whether the cut line produces a sufficiently smooth blend line between the two images. To determine the degree of match along the cut line 704, the mean squared RGB difference value for each of the pixels along the cut line 704 can be compared against a numeric difference value. If the difference value for a pixel exceeds the selected threshold, then the image areas along the cut line at that pixel location can be further processed to improve the match between the images to produce a smoother blending of the images. The representative areas 800 of FIG. 8 show exemplary areas where the difference value for the pixels exceeds the threshold, with the resultant blended single image being blurred in these mismatched areas.

To improve the fit between the two images along the cut line, the two images can be warped, or spatially bent or morphed, in the areas of disagreement to better align the pixels in the mismatch areas. Referring to FIG. 9, the original grid of pixels for the blended image at an area of disagreement is shown by 900. By warping the grid to the left along a horizontal plane by the magnitude of a Gaussian function, the distorted grid at 902 is produced. Application of this warping process on an exemplary image is shown in FIG. 10. Here, FIG. 10A shows the detail of the boy's head from the blended image from the original two images 500 and 502 of FIG. 5. Even though the two images have been blended together to form a composite image along a cut line of minimal disagreement, some details, such as the boy's ear, are distorted, as shown in FIG. 10A at 1000. After Gaussian warping, the ear 1002 is still distorted in FIG. 10B, but the double image has been eliminated.

For each area of disagreement along the cut line that exceeds a threshold, exemplary embodiments can iteratively warp the images in the areas of disagreement along a plurality of common planes by a plurality of magnitude of warp until the minimum pixel disagreement is found. For example, the warping shown in FIG. 10 has warped the two images along a horizontal plane to produce the warped image in FIG. 10B. In exemplary embodiments, eight different planes of warping can be sampled to find the orientation of distortion that produces the best match between the two images along the cut line. For each plane of warping, a plurality of degrees or magnitudes of warping can be applied to find the best fit between the images, thereby producing a smoothly blended single image. The direction of warping can also be variable to find the best fit. For example, the pixels of image 500 could be warped to the right in an area 800 of mismatch, while the pixels of image 502 could be warped to the left in the corresponding area 800 of mismatch to find the best fit.

Although exemplary embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method for blending images into a composite image, comprising:
    selecting two images having overlapping content;
    dividing the two images into strips;
    selecting a strip in each of the two images where the two images overlap each other;
    determining differences between the overlapping strips;
    determining a minimized line through the overlapping strips where the differences between the overlapping strips are minimized; and
    blending the two images together along the minimized line to create a composite image.

2. The method according to claim 1, wherein the selected images belong to a set of images comprising a scene.

3. The method according to claim 1, wherein the selected images are divided along a common plane.

4. The method according to claim 1, wherein the selected images are divided into strips along one of a vertical plane or a horizontal plane.

5. The method according to claim 1, wherein the two overlapping strips are selected according to a mean squared difference algorithm such that the sum of the mean squared difference values between the two selected strips is minimized.

6. The method according to claim 1, including:
    calculating a squared color difference value for each pixel pair between the overlapping strips;
    converting the squared color difference values into a gray scale image of the overlapping strips, wherein the brightest pixels in the gray scale image correspond to the pixels of greatest difference between the two overlapping strips;
    sorting the gray scale pixels from largest to smallest difference value;
    for each sorted gray scale pixel, mapping the gray scale pixel to one of two regions within the overlapping strip according to the adjacency of the gray scale pixel to the one of the two regions;
    determining a cut line between the two regions;
    cutting each selected image along the cut line within the overlapping strip of each selected image; and
    combining the two cut selected images along the cut line to form the composite image.

7. The method according to claim 6, wherein the cut line is determined between a first region and a second region to which the pixels have been mapped.

8. The method according to claim 6, wherein the cut line corresponds to the line of best match between the overlapping strips.

9. The method according to claim 6, wherein at least one of the cut images is warped along the cut line to improve the fit between the two cut images along the cut line.

10. The method according to claim 1, wherein the blending of images is performed iteratively, with the blended composite image being utilized as one of the selected two images to be blended.

11. The method according to claim 10, wherein the method of blending is performed iteratively until all images comprising the scene have been blended into a final image of the scene.

12. The method according to claim 1, wherein the selecting comprises selecting the strips of the two images which provide reduced error between the overlapping strips compared with non-selected strips of the two images.

13. The method according to claim 1, wherein the determining differences comprises determining differences between image data content of the overlapping strips.

14. The method according to claim 13 wherein the determining differences between image data content comprises determining differences between the image data content of one pixel of one of the overlapping strips and one pixel of another of the overlapping strips and wherein the one pixels of the one and the another of the overlapping strips both correspond to the same subject present in the two images.

15. The method according to claim 13 wherein the determining differences comprises determining differences between the image data content comprising color space content of the overlapping strips.

16. The method according to claim 1, wherein the selecting a strip in each of the two images comprises selecting the strips in the two images which comprise the same content of a scene present in the two images.

17. The method according to claim 1, wherein the selectings, dividing, determinings and blending comprise selectings, dividing, determinings and blending using processing circuitry.

18. The method according to claim 1, further comprising storing the composite image.

19. The method according to claim 18, further comprising displaying the composite image.

20. A method for blending two images into a composite image, comprising:
dividing two images into strips along a common plane;
selecting a strip in each image where the two images overlap, wherein the selecting comprises selecting the overlapping strips which have reduced error between the overlapping strips compared with non-selected overlapping strips of the two images;
determining a minimized line through the selected overlapping strips where differences between the selected overlapping strips are minimized;
blending the two images along the minimized line to create a composite image; and
warping the composite image to minimize blurring along the minimized line.

21. The method according to claim 20, wherein the minimized line is determined by calculating mean squared difference values for pairs of pixels between the two selected overlapping strips.

22. The method according to claim 20, wherein at least one of the images is warped where the differences between the selected overlapping strips along the blending line exceed a predetermined threshold.

23. The method according to claim 20, wherein the dividing, selecting, determining, blending and warping comprise dividing, selecting, determining, blending and warping using processing circuitry.

24. The method according to claim 20, further comprising storing the composite image.

25. The method according to claim 24, further comprising displaying the composite image.

26. A computer-based system for blending images into a composite image, comprising:
a computer configured to:
divide two images having overlapping content into strips along a common plane wherein each strip is a long and narrow piece of the image having one dimension which is greater than another dimension of the respective strip;
select a strip of uniform width in each of the two images where the two images overlap each other;
determine pixel difference values between the overlapping strips;
determine a minimized line through the overlapping strips where a sum of the pixel difference values between the overlapping strips is minimized; and
blend the two images together along the minimized line to create a composite image.

27. The system according to claim 26, wherein the two overlapping strips are selected according to a mean squared difference algorithm such that the sum of the mean squared difference values between the overlapping strips is minimized.

28. The system according to claim 26, wherein the computer is configured to:
calculate a squared color difference value for each pixel pair between the overlapping strips;
convert the squared color difference values into a gray scale image of the overlapping strips, wherein the brightest pixels in the gray scale image correspond to the pixels of greatest difference between the two overlapping strips;
sort the gray scale pixels from largest to smallest difference value;
for each sorted gray scale pixel, map the gray scale pixel to one of two regions within the overlapping strip according to the adjacency of the sort gray scale pixel to the one of the two regions;
determine a cut line between the two regions;
cut each image along the cut line of the overlapping strip of each image; and
combine the two cut images along the cut line to form the composite image.

29. The system according to claim 28, wherein the cut line is determined by calculating mean squared difference values for pairs of pixels between the two selected image strips.

30. The system according to claim 28, wherein at least one of the images is warped where the differences between the selected strips along the cut line exceed a predetermined threshold.

31. A system for blending images into a composite image, comprising:
means for dividing two images having overlapping content into strips along a common plane in at least one region of overlap wherein each strip is a long and narrow piece of the image having one dimension which is greater than another dimension of the respective strip;
means for calculating difference values between image data content of respective pixels of the two images in corresponding strips of uniform length in the at least one region of overlap;
means for determining a cut line through the two images where the difference values are minimized; and
means for blending the two images along the cut line to create a composite image.

32. A system for blending images into a composite image, comprising:
a first computing module dividing two images having overlapping content into strips along a common plane in at least one region of overlap;
a second computing module calculating difference values between pixels of the two images in the at least one region of overlap, wherein the difference values individually correspond to a difference of image data content between a pair of corresponding pixels of the two images;
a third computing module determining a cut line through the two images where the difference values are minimized; and
a fourth computing module blending the two images along the cut line to create a composite image.

33. The system according to claim 32, including selecting two overlapping strips according to a mean squared difference algorithm such that the sum of the mean squared difference values between the two overlapping strips is minimized.

34. The system according to claim 32, including:
a fifth computing module cutting the two images along the cut line; and
a sixth computing module joining the cut images together to create the composite image.

35. The system according to claim 32, wherein the blending of images is performed iteratively, with the composite image being utilized as one of the two images to be blended.

36. The system according to claim 32, wherein the pairs of the pixels individually correspond to the same subject present in the two images.

37. A non-transitory computer readable medium storing software for blending images into a composite image, wherein the software is provided for:
selecting two images having overlapping content;
dividing the two images into strips along a common plane where the two images overlap each other;
selecting a strip in each of the two images;
determining the differences between the overlapping strips;
determining a minimized line through the overlapping strips where the differences between the overlapping strips are minimized; and
blending the two images together along the minimized line to create a composite image.

38. The software according to claim 37, wherein the two overlapping strips are selected according to a mean squared difference algorithm such that the sum of the mean squared difference values between the overlapping strips is minimized.

39. The software according to claim 37, wherein the software is provided for:
calculating a difference value for each pixel pair between the two overlapping strips;
converting the calculated difference values into a gray scale image of the overlapping strips, wherein the brightest pixels in the gray scale image correspond to the pixels of greatest difference between the two overlapping strips;
sorting the gray scale pixels from largest to smallest difference value;
for each sorted gray scale pixel, mapping the gray scale pixel to a first region or a second region within the overlapping strip according to the adjacency of the gray scale pixel to the first region or the second region;
determining a cut line within the overlapping strips between the first mapped region and the second mapped region;
cutting each selected image along the cut line of the overlapping strip of each selected image; and
combining the two cut selected images along the cut line to form the composite image.

40. The software according to claim 37, wherein the selecting a strip in each of the two images comprises selecting the strips in the two images which comprise the same content of a scene present in the two images.

* * * * *